June 23, 1953  A. C. GILES  2,643,150
CLAMPING RING CLOSURE
Filed Nov. 4, 1948  2 Sheets-Sheet 1

INVENTOR
A. C. Giles
By his Attorney
A. J. Davies

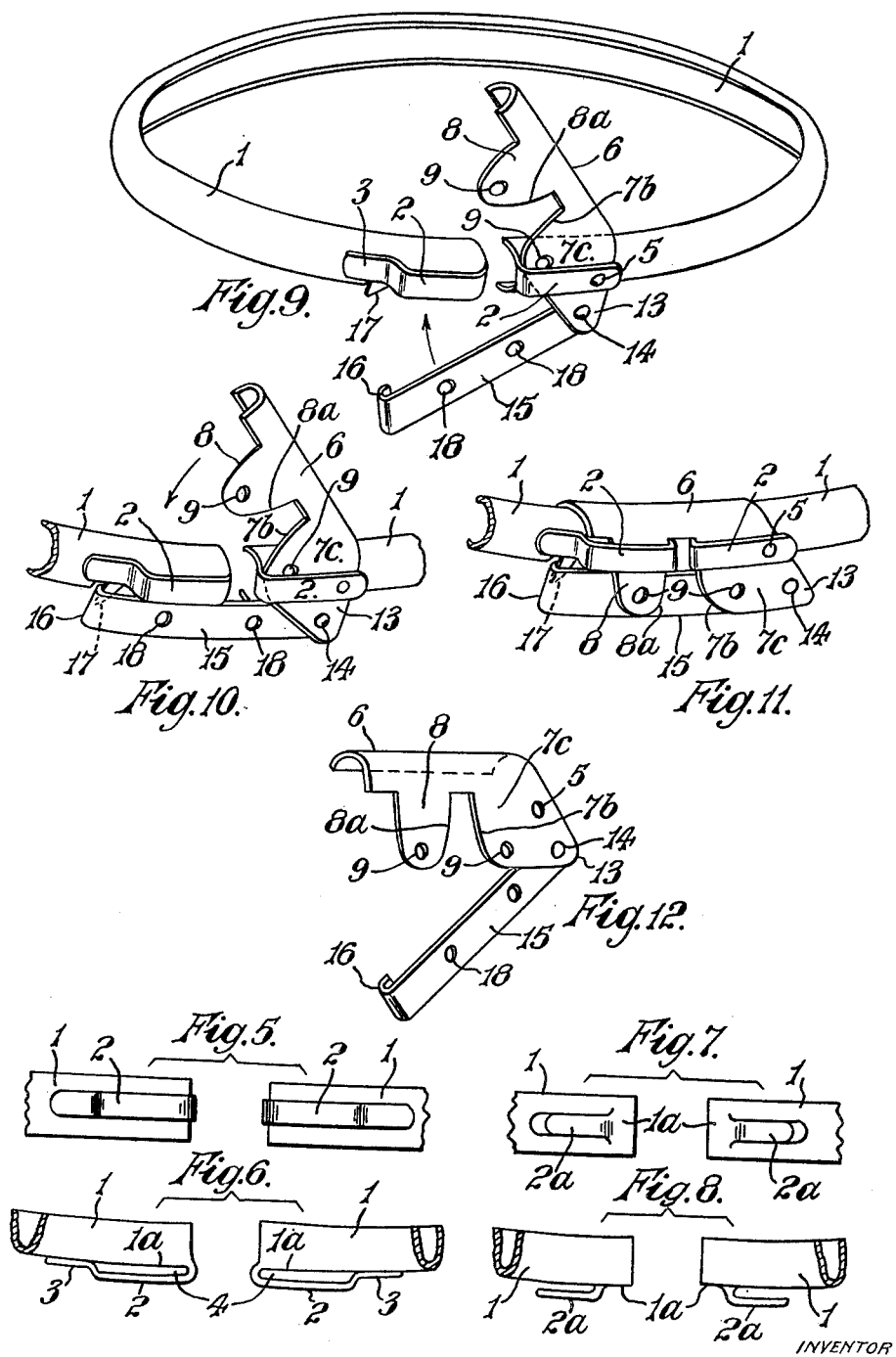

Patented June 23, 1953

2,643,150

UNITED STATES PATENT OFFICE 2,643,150

CLAMPING RING CLOSURE

Arthur Charles Giles, Birkenhead, England

Application November 4, 1948, Serial No. 58,182
In Great Britain January 8, 1948

4 Claims. (Cl. 292—256.69)

This invention relates to clamping ring closures for securing the lids of drums, kegs and like containers of the kind in which the container and its lid or cover are provided with peripheral flanges or beadings which, when the cover is in position, are engaged and compressed together by a divided channel-section clamping ring, which is contracted about the flanges of the container and its lid and retained in such contracted position to form an effective closure for the container. It is desirable when such a clamping ring is fully contracted that the ends of the ring should be securely connected together independently of any pins or the like in the contracting mechanism, such as the pivotal pins or links in lever operated mechanism, which are liable to fracture under heavy usage or corrode and so release the ring permitting it and the cover to become disengaged. The present invention concerns means whereby when the clamping ring is closed it is securely retained in such closed condition, quite independently of any pins, levers, links or other similar parts.

According to this invention each end of a divided clamping ring closure of the kind referred to for drums, kegs and like containers is formed or provided with a loop, hook, recess, abutment or other engageable means with which a latch, clip or like member connected to one end of the ring is adapted to be engaged when the clamping ring is contracted and to retain it contracted independently of any pivotal connection in the contracting mechanism. Further features of the invention relate to an arrangement of the latch or clip as a lever-link mechanism in order to obtain preliminary contraction of the ring before the latch is engaged. Further features of the invention are set out in the appended claims.

In the accompanying explanatory drawings:

Fig. 5 is a fragmentary end view and Fig. 6 a plan of the ring ends with a closed loop welded on each end.

Figs. 7 and 8 are fragmentary end and plan views of open hook members in the ring ends.

Fig. 9 is a perspective view of a clamping ring fitted with a modified arrangement of latch having a lever-link mechanism for preliminary contraction of the ring, the latch being open.

Fig. 10 is a fragmentary view showing the link engaged, and

Fig. 11 shows the latch mechanism finally closed.

Fig. 12 is a perspective view of the lever-link latch detached.

Figure 1:
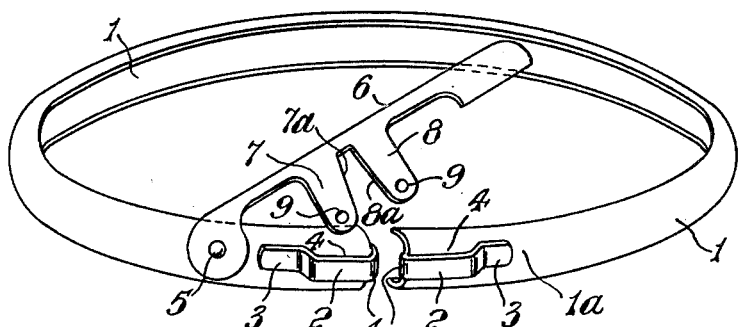
Fig. 1 is a perspective view of a clamping ring provided with a pivoted latch or clip, the latch being disengaged and the ring uncontracted.
Figure 2:
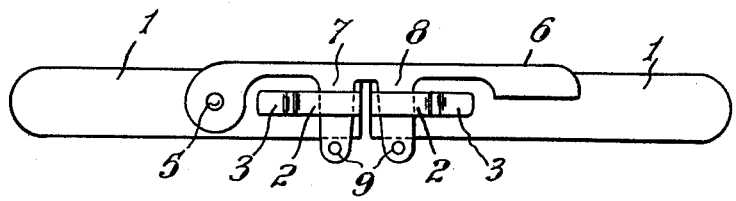
Fig. 2 is an end view of the mechanism with the latch engaged and securing the ends of the ring contracted.

In the form of the invention shown in Figs. 1 to 6 each end of the divided channel section clamping ring 1 is provided with a loop 4 formed by bending back on to each end a strip 2 extending integrally from the crown 1a of the ring, Figs. 5 and 6, this strip having its tip 3 then secured as by spot-welding to the ring to form an elongated loop 4. Pivoted at 5 on one end of the ring is a latch or clip 6, also, if desired, formed from channel section material, but so pivoted to the crown of the ring that the channel part of the latch is approximately at right angles to the channelling of the clamping ring. Extending from one side of the latch clip are two spaced projections or tongues 7, 8 adapted to enter the loops 4 on the ends of the clamping ring. The opposing edges 7a, 8a of these projections are relatively inclined to leave a tapered opening between them, the inclined edges engaging the adjacent ends 4a of the two loops on the ring when the latch clip 6 is folded down, Fig. 2, and the projections enter the loops. When the latch is so operated the edge 7a of the tongue 7 bears on the end of the loop in which it enters and the edge 8a of the tongue 8 bears against the end of the other loop and thereby operates to contract the ring. The ring, when contracted, is held in its contracted position by the two tongues which bear on the loops and the tongues will continue to hold the ring in such position in the event of the pivot of the latch being fractured. When the latch is operated it exerts no shearing force on its pivot as it is the opposed edges 7a and 8a which, by co-operation with the loops, contract the ring and retain it in its contracted position. In the ends of the projections are formed apertures 9 through which a wire may then be threaded and secured by a lead seal, or a metal strip may be connected across the apertures. By connecting a metal strip across the projections they are reinforced and any tendency to spread under the tension of the contracted ring is prevented.

Figure 3:
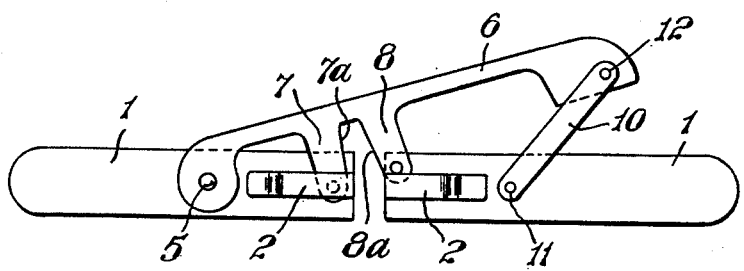
Fig. 3 is an end view of an uncontracted ring with a latch device similar to that shown in Fig. 1 but having a link for effecting preliminary contraction of the ring.
Figure 4:
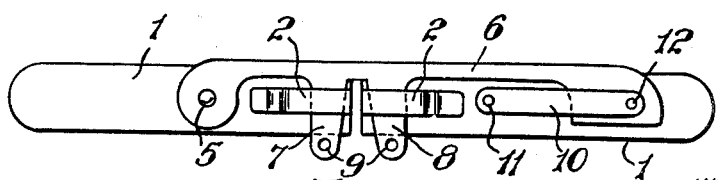
Fig. 4 is a similar end view showing the ring contracted and the latch engaged.

If desired means may be provided for effecting a preliminary contraction of the clamping ring in order to assist the terminal closing action of the latch clip 6, and with this object the latch may be lengthened, Figs. 3 and 4, to increase the leverage, and be pivotally connected at 11 by a link 10 to the end of the ring other than that to which the lever is pivoted at 5, the link being pivoted at 12 to the lever. As the latch is depressed the thrust of the link 10 contracts the ring bringing the loops 4 to a position suitable for the final insertion of the tongues 7, 8, Fig. 4.

In a modification, Figs. 7 and 8, instead of closed loops being formed on the ends of the ring, tongues 2a are stamped up from the crown of the ring to form hooks facing in opposite directions, the projections 7, 8 of the latch clip when closed engaging behind the roots of the two hooks to retain the ring contracted.

In a further modification, Figs. 9 to 12, the latch 6 is pivoted at 5 to the clamping ring through the strip 2 of one of the loops and one projection 7c of the latch is formed with a cam edge 7b eccentric to the pivot 5, a short extension or heel 13 on the latch being pivotally connected at 14 to a link 15, the outer end of which is bent to form a hook 16 for engaging a prong 17 formed in any suitable manner on the opposite end of the clamping ring 1. For instance, the prong may be formed by merely making a slot in the edge of the clamping ring and then bending out the salient corner of metal, or a projecting prong may be welded on the edge of the ring. With such an arrangement, the ring in the expanded condition shown in Fig. 9 is placed in position for securing the cover on the drum or like container and the hook 16 of the link 15 engaged with the prong 17, as shown in Fig. 10. The latch 6 is then pushed down, its heel 13 pulling on the link 15 and drawing the ends of the ring 1 together to effect a preliminary contraction, the terminal closing movement of the latch 6 bringing the eccentric cam edge 7b into engagement with the end of its loop while the inclined edge 8a of the other projection similarly engages the end of its loop on the other end of the ring, the clamping action of edge 8a effecting a final contraction of the ring to the closed position, Fig. 11. Holes 18 may be formed in the link 15 in positions such that they register with the corresponding holes 9 in the latch 6 when the latter is finally engaged, a sealing wire being passed through the registering holes to secure the latch against unauthorised tampering with the closure. Instead of a sealing wire rivets may be fitted in the registering holes to secure the latch and also strengthen the closure.

The latch mechanism may be economically made of an aluminum alloy without detriment to the strength of the device.

The distinguishing feature of the invention is the provision of a latch on a clamping ring closure which, when the ring has been contracted to secure the cover on a drum, is adapted to connect the ring ends independently of any pivots or the like in the mechanism by which the ring has been contracted.

By providing a thrust link such as described and shown in Figs. 3 and 4, or the tension link 15 of Figs. 9 to 12, for effecting a preliminary contraction of the clamping ring, should the ring be somewhat larger than the lid and drum beading the loops on the ring ends are brought into a suitable position for the terminal engagement of the latch, which preliminary contraction would otherwise have to be effected manually or by means of special contracting devices.

Any of the arrangements described may be used with or without a lever contracting mechanism.

What I claim is:

1. A clamping ring closure device comprising a divided channel section ring, engageable means on both ends of the divided ring, a latch pivoted near to one end of the divided ring and dimensioned to overlap the other end of the ring, said latch having two projecting tongues the opposed edges of which diverge from each other towards their outer ends and which are positioned to engage with said engageable means, and a link pivotally connected to the overlapping end of the latch and to the overlapped end of the ring, said link being arranged to effect a preliminary contraction of the ring when the latch is turned about its pivot towards the ring and the final contraction effected when the edge of the tongue remote from the latch pivot bears on the engageable means on that end of the ring near to which the latch is pivoted while the opposed edge of the other tongue co-operates with the engageable means on the other end of the ring, and effects the final contraction, the tongues, when the ring is so contracted holding it in its contracted position.

2. A clamping ring closure device comprising a divided channel-section ring, engageable means on both ends of said divided ring, a latch pivoted near one of its ends to near one end of the divided ring, said latch having two projecting tongues the opposed edges of which diverge from each other towards their outer ends and which are positioned to engage with said engageable means, a link pivotally connected to said latch near its pivot, and an abutment near the other end of said ring and located to be engaged by said link to effect a preliminary contraction of the ring as the latch is turned about its pivot towards the ring, the final contraction being effected when the edge of one of the tongues bears on the engageable means on that end of the ring near to which the latch is pivoted and the edge of the other tongue co-operates with the engageable means on the other end of the ring and thereby effects said final contraction, the tongues then holding the ring in its contracted position.

3. A clamping ring closure device as claimed in claim 2 in which the edge of the tongues nearer the pivot of the latch is eccentric to the pivot.

4. A clamping ring closure device comprising a divided channel section ring, a loop on both ends of said divided ring, a latch pivoted near one of its ends to the loop on one end of said ring, said latch having two projecting tongues the opposed edges of which diverge from each other towards their outer ends and which are positioned to engage with said loops, a link pivotally connected to one end of said latch adjacent the pivot, an abutment near the other end of said ring and located to be engaged by said link to effect a preliminary contraction of the ring when the latch is turned about its pivot towards the ring, the final contraction being effected when one of the edges bears on the loop on that end of the ring to which the latch is pivoted and the other edge co-operates with the loop on the other end of the ring and thereby effects the final contraction, the tongues then holding the ring in its contracted position.

ARTHUR CHARLES GILES.

References Cited in the file of this patent

UNITED STATES PATENTS

| Number | Name | Date |
|---|---|---|
| 944,376 | Ohrmundt et al. | Dec. 28, 1909 |
| 2,011,044 | Fetter | Aug. 13, 1935 |
| 2,082,881 | Fetter | June 8, 1937 |
| 2,304,539 | Carpenter | Dec. 8, 1942 |
| 2,382,858 | Carpenter | Aug. 14, 1945 |

FOREIGN PATENTS

| Number | Country | Date |
|---|---|---|
| 621,163 | France | Jan. 31, 1927 |
| 671,146 | France | Aug. 31, 1929 |

OTHER REFERENCES

Ser. No. 348,520, Grobener (A. P. C.), published May 25, 1943.